US012785150B2

(12) United States Patent
Wu et al.

(10) Patent No.: US 12,785,150 B2
(45) Date of Patent: Nov. 3, 2026

(54) ELECTROLYTE SOLUTION, SECONDARY BATTERY, BATTERY MODULE, BATTERY PACK AND DEVICE

(71) Applicant: CONTEMPORARY AMPEREX TECHNOLOGY (HONG KONG) LIMITED, Hong Kong (CN)

(72) Inventors: Zeli Wu, Ningde (CN); Changlong Han, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 696 days.

(21) Appl. No.: 17/819,303

(22) Filed: Aug. 11, 2022

(65) Prior Publication Data

US 2022/0407117 A1 Dec. 22, 2022

Related U.S. Application Data

(63) Continuation of application No. PCT/CN2021/080530, filed on Mar. 12, 2021.

(51) Int. Cl.

*H01M 10/0569* (2010.01)
*H01M 10/0567* (2010.01)
*H01M 10/0568* (2010.01)

(52) U.S. Cl.

CPC ... *H01M 10/0569* (2013.01); *H01M 10/0567* (2013.01); *H01M 10/0568* (2013.01); *H01M 2300/0028* (2013.01); *H01M 2300/0037* (2013.01); *H01M 2300/004* (2013.01)

(58) Field of Classification Search

CPC ......... H01M 10/0569; H01M 10/0567; H01M 2300/0028; H01M 2300/0025; H01M 10/0525; H01M 10/0568; H01M 2300/0037; H01M 2300/004

See application file for complete search history.

(56) References Cited

U.S. PATENT DOCUMENTS

2016/0306612 A1 10/2016 Hewitt et al.
2019/0305317 A1* 10/2019 Cheng ............... H01M 10/0568
2019/0305373 A1 10/2019 Iguchi et al.
2021/0036365 A1 2/2021 Kim et al.

FOREIGN PATENT DOCUMENTS

CN 104995785 A 10/2015
CN 110311170 A 10/2019
CN 110556580 A 12/2019
CN 110752408 A 2/2020
CN 111129598 A 5/2020
CN 111640977 A 9/2020
CN 112582674 A 3/2021
EP 2 958 183 * 12/2015
EP 3703174 A1 9/2020
EP 3713004 A1 9/2020
EP 3863092 A1 8/2021
EP 3944392 A1 1/2022
JP 2019175592 A 10/2019
JP 2023520319 A 5/2023
WO 2020090678 A1 5/2020
WO 2020137560 A1 7/2020
WO 2021034141 A1 2/2021

OTHER PUBLICATIONS

International Search Report and Written Opinion received in International Application PCT/CN2021/080530 on Nov. 26, 2021.
The extended European search report received in European Application 21912309.8, mailed Apr. 25, 2023.
The Notice of Reasons for Refusal received in the counterpart Japanese Application 2022-556621, mailed Nov. 24, 2023.
The Notice of Allowance of the counterpart KR application No. 10-2022-7033767, dated Apr. 25, 2025, 12 pages with English translation.
Office Action (with English Machine Translation), mailed Oct. 31, 2025, for corresponding Japanese Patent Application Serial No. 2024-229482.
Office Action (with English Machine Translation), mailed Apr. 15, 2026, for corresponding Chinese Patent Application Serial No. 202180093981.7.

* cited by examiner

*Primary Examiner* — Laura Weiner
(74) *Attorney, Agent, or Firm* — K&L Gates LLP

(57) ABSTRACT

An electrolyte solution includes an electrolyte salt and an organic solvent, wherein the electrolyte salt includes lithium bis(fluorosulfonyl)imide (LiFSI), and the percentage mass content of the lithium bis(fluorosulfonyl)imide (LiFSI) in the electrolyte solution is 4.5%-11%; the organic solvent includes ethylene carbonate, and the percentage mass contents of the ethylene carbonate and the lithium bis(fluorosulfonyl)imide satisfy: $0.9 \leq W_{LiFSI}/(16.77\%-W_{EC}) \leq 2.9$. The electrolyte solution of the present disclosure can make the battery take lower cell internal resistance, excellent high temperature storage performance and high temperature cycling performance into account at the same time.

10 Claims, 2 Drawing Sheets

ELECTROLYTE SOLUTION, SECONDARY BATTERY, BATTERY MODULE, BATTERY PACK AND DEVICE

CROSS-REFERENCE TO RELATED APPLICATIONS

This application claims priority to International Application PCT/CN2021/080530, filed Mar. 12, 2021 and entitled "SPECIFICATION ELECTROLYTE SOLUTION, SECONDARY BATTERY, BATTERY MODULE, BATTERY PACK AND DEVICE", which are incorporated herein by reference in their entireties.

TECHNICAL FIELD

The present disclosure relates to the technical field of batteries, and in particular to an electrolyte solution, a secondary battery, a battery module, a battery pack and a device.

BACKGROUND ART

In recent years, with the increasing exhaustion of fossil energy and the increasing pressure of environmental pollution, a secondary battery has received unprecedented attention and development. The disclosure range of the secondary battery is becoming more and more wide, for example, in hydropower, firepower, wind power and solar power stations, and the like energy storage power source systems, as well as in many fields of electric tools, electric bicycles, electric motorcycles, electric vehicles, military equipment, aerospace and the like.

With the continuous development of the secondary battery, a user has put forward higher use requirements on it (for example, the battery should take power performance, cycling performance and storage performance, etc. into account at the same time). Therefore, it is urgent to develop a secondary battery with good comprehensive performance.

SUMMARY OF THE INVENTION

The present disclosure has been made in view of the aforementioned problems, and an objective of the present disclosure is to provide an electrolyte solution, a secondary battery, a battery module, a battery pack and a device, which can make the secondary battery including the electrolyte solution take better power performance (lower cell internal resistance), high temperature cycling performance and high temperature storage performance into account at the same time.

In order to achieve the aforementioned objective, a first aspect of the present disclosure provides an electrolyte solution including an electrolyte salt and an organic solvent, wherein the electrolyte salt includes lithium bis(fluorosulfonyl)imide (LiFSI), and the percentage mass content of the lithium bis(fluorosulfonyl)imide (LiFSI) in the electrolyte solution is 4.5%-11%; the organic solvent includes ethylene carbonate (EC), and the electrolyte solution satisfies: 0.9≤WLiFSI/(16.77%−WEC)≤2.9, wherein WLiFSI is the percentage mass content of the lithium bis(fluorosulfonyl)imide (LiFSI) in the electrolyte solution, and WEC is the percentage mass content of the ethylene carbonate (EC) in the electrolyte solution.

When the electrolyte solution satisfies the aforementioned conditions at the same time, the secondary battery can take better power performance (lower cell internal resistance), high temperature cycling performance and high temperature storage performance into account at the same time.

In some embodiments, the electrolyte solution satisfies: $1.05 \le W_{LiFSI}/(16.77\% - W_{EC}) \le 2.9$. When the electrolyte solution satisfies this condition, it can further improve the power performance, high temperature cycling performance and high temperature storage performance of the battery.

In some embodiments, the electrolyte solution further includes an additive including lithium difluorophosphate ($LiPO_2F_2$).

In some embodiments, the mass ratio of the lithium bis(fluorosulfonyl)imide (LiFSI) to the lithium difluorophosphate ($LiPO_2F_2$) is 7-26, optionally 11-22. When the mass relationship between the lithium bis(fluorosulfonyl)imide (LiFSI) and the lithium difluorophosphate ($LiPO_2F_2$) is controlled within the given range, it can further improve the high temperature cycling performance of the battery.

In some embodiments, the ratio of the sum of the masses of the ethylene carbonate and the lithium bis(fluorosulfonyl)imide to the mass of the lithium difluorophosphate is 20-68, optionally 28-51. When the mass relationship among the ethylene carbonate, the lithium bis(fluorosulfonyl)imide and the lithium difluorophosphate is controlled within the given range, it can further improve the high temperature cycling performance of the battery.

In some embodiments, the percentage mass content of the lithium difluorophosphate ($LiPO_2F_2$) in the electrolyte solution is below 1%, optionally 0.3%-0.7%. When the lithium difluorophosphate is included in the additive of the electrolyte solution, especially when its mass ratio is controlled within the given range, it can further improve the high temperature cycling performance of the battery.

In some embodiments, the sum of the percentage mass contents of the ethylene carbonate (EC) and the lithium bis(fluorosulfonyl)imide (LiFSI) in the electrolyte solution is 16%-24%, optionally 17%-24%. When the mass relationship between the ethylene carbonate and the lithium bis(fluorosulfonyl)imide is controlled within the given range, it can further improve the power performance, high temperature cycling performance and high temperature storage performance of the battery.

In some embodiments, the percentage mass content of the lithium bis(fluorosulfonyl)imide (LiFSI) in the electrolyte solution is 6%-11%. When the content of the lithium bis(fluorosulfonyl)imide is controlled within the given range, it can further improve the power performance, high temperature cycling performance and high temperature storage performance of the battery.

In some embodiments, the percentage mass content of the ethylene carbonate (EC) in the electrolyte solution is 8.3%-15.2%, optionally 10%-15.2%. When the mass ratio of the ethylene carbonate is controlled within the given range, it can further improve the power performance, high temperature cycling performance and high temperature storage performance of the battery.

In some embodiments, the electrolyte salt further includes lithium hexafluorophosphate ($LiPF_6$), and optionally, the sum of the percentage mass contents of the lithium hexafluorophosphate and the lithium bis(fluorosulfonyl)imide in the electrolyte solution is 15.7%-17.2%. When the mass relationship between the lithium hexafluorophosphate ($LiPF_6$) and the lithium bis(fluorosulfonyl)imide is controlled within the given range, the concentration of $Li^+$ in the electrolyte solution will be kept within an appropriate range, which will make the electrolyte solution have good conductivity.

A second aspect provides a secondary battery including the electrolyte solution of the first aspect of the present disclosure.

A third aspect provides a battery module including the secondary battery of the second aspect of the present disclosure.

A fourth aspect provides a battery pack including the battery module of the third aspect of the present disclosure.

A fifth aspect provides a device including at least one of the secondary batteries of the second aspect of the present disclosure, the battery module of the third aspect of the present disclosure, or the battery pack of the fourth aspect of the present disclosure.

DETAILED DESCRIPTION

Figure 1:
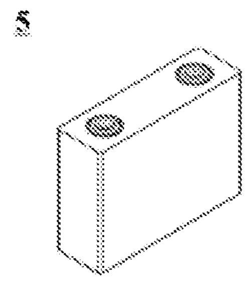
FIG. 1 is a schematic diagram of a secondary battery according to an embodiment of the present disclosure.

Hereinafter, the embodiments of the electrolyte solution, secondary battery, battery module, battery pack and device of the present disclosure are specifically disclosed by referring to the detailed description of the drawings as appropriate. However, unnecessary detailed description may be omitted. For example, there are cases where detailed description of well-known matters and repeated descriptions of the actually same structure are omitted. This is to avoid unnecessary verbosity in the following description and facilitate the understanding of those skilled in the art. Furthermore, the accompanying drawings and the following description are provided for enabling those skilled in the art to fully understand the present disclosure, and are not intended to limit the subject matter recorded in the claims.

DESCRIPTION OF REFERENCE NUMERALS

1 battery pack
2 upper box
3 lower box
4 battery module
5 secondary battery
51 case
52 electrode assembly
53 Top cover assembly For the sake of conciseness, the present disclosure discloses some numerical ranges. However, any lower limit can be combined with any upper limit to form an unspecified range; and any lower limit can be combined with other lower limits to form an unspecified range, and likewise, any upper limit can be combined with any other upper limit to form an unspecified range. Moreover, each separately disclosed point or single numerical value itself can be used as a lower or upper limit to form an unspecified range in combination with any other point or single numerical value or with other lower or upper limits.

In an embodiment of the present disclosure, the present disclosure provides an electrolyte solution including an electrolyte salt and an organic solvent, wherein the electrolyte salt includes lithium bis(fluorosulfonyl)imide (LiFSI) and the percentage mass content of the bis(fluorosulfonyl) imide (LiFSI) in the electrolyte solution is 4.5%-11%; the organic solvent includes ethylene carbonate (EC), and the percentage mass contents of the ethylene carbonate (EC) and the bis(fluorosulfonyl)imide (LiFSI) satisfy: $0.9 \leq W_{LiFSI}/(16.77\% - W_{EC}) \leq 2.9$, wherein $W_{LiFSI}$ is the percentage mass content of the lithium bis(fluorosulfonyl)imide (LiFSI) in the electrolyte solution, and $W_{EC}$ is the percentage mass content of the ethylene carbonate (EC) in the electrolyte solution.

The electrolyte solution of the present disclosure includes specific kinds of electrolyte salts and organic solvents, and the contents of the electrolyte salts and organic solvents are specially designed, so that the battery adopting the electrolyte solution takes better power performance (lower cell internal resistance), high temperature cycling performance and high temperature storage performance into account at the same time.

After a lot of research, the inventor(s) has found that although the bis(fluorosulfonyl)imide (LiFSI) has good ionic conductivity and dissociation degree and can be effectively dissociated in the electrolyte solution, the bis(fluorosulfonyl)imide (LiFSI) is easily oxidized on a surface of a positive electrode, which has an impact on the high temperature cycling performance of the secondary battery; when the bis(fluorosulfonyl)imide (LiFSI) is used in the electrolyte solution for improving the power performance, the ethylene carbonate (EC) is added into the organic solvent, and meanwhile the contents of both of them are adjusted so that the electrolyte solution satisfies $0.9 \leq W_{LiFSI}/(16.77\% - W_{EC}) \leq 2.9$, and thus the battery can take better power performance (lower cell internal resistance), high temperature cycling performance and high temperature storage performance into account at the same time.

In some embodiments, $W_{LiFSI}/(16.77\% - W_{EC})$ can be within a numerical range consisting of any two of the following listed numerical values as end values: 0.9, 0.92, 1.05, 1.11, 1.14, 1.4, 1.44, 1.47, 1.75, 1.77, 1.78, 1.79, 1.80, 1.82, 2.16, 2.2, 2.45, 2.49, 2.5, 2.84, 2.9. For example, $1.05 \leq W_{LiFSI}(16.77\% - W_{EC}) \leq 2.9$, $1.4 \leq W_{LiFSI}/(16.77\% - W_{EC}) \leq 2.5$, $1.75 \leq W_{LiFSI}/(16.77\% - W_{EC}) \leq 2.2$. It should be noted that although the inventor has listed the aforementioned numerical values side by side, it doesn't mean that equivalent or similar performance can be obtained when $W_{LiFSI}/(16.77\% - W_{EC})$ is within a range consisting of any two of the aforementioned numerical values as endpoints. Regarding a preferred range of $W_{LiFSI}(16.77\% - W_{EC})$ in the present disclosure, it can be selected based on the specific discussion and specific experimental data hereafter.

In some embodiments, the electrolyte solution also includes an additive including lithium difluorophosphate ($LiPO_2F_2$).

In some embodiments, the mass ratio $W_{LiFSI}/W_{LiPO2F2}$ of the bis(fluorosulfonyl)imide (LiFSI) to the lithium difluorophosphate ($LiPO_2F_2$) is 7-26, optionally 11-22, wherein $W_{LiPO2F2}$ is the percentage mass content of the lithium difluorophosphate ($LiPO_2F_2$) in the electrolyte solution. Optionally, the mass ratio of the bis(fluorosulfonyl)imide (LiFSI) to the lithium difluorophosphate ($LiPO_2F_2$) can be within a numerical range consisting of any two of the following listed numerical values as end values: 7, 7.70, 11.00, 12.32, 12.83, 15.40, 19.25, 21.56, 22, 25.67, 26. For example, $7 \le W_{LiFSI}/W_{LiPO2F2} \le 26$, $11 \le W_{LiFSI}/W_{LiPO2F2} \le 26$, $11 \le W_{LiFSI}/W_{LiPO2F2} \le 22$. It should be noted that although the inventor has listed the aforementioned numerical values side by side, it doesn't mean that equivalent or similar performance can be obtained when $W_{LiFSI}/W_{LiPO2F2}$ is within a range consisting of any two of the aforementioned numerical values as endpoints. Regarding a preferred range of $W_{LiFSI}/W_{LiPO2F2}$ in the present disclosure, it can be selected based on the specific discussion and specific experimental data hereafter.

The inventor(s) has found that when the lithium difluorophosphate ($LiPO_2F_2$) is included in the additive of the electrolyte solution, especially when the mass relationship between the bis(fluorosulfonyl)imide (LiFSI) and the lithium difluorophosphate ($LiPO_2F_2$) is controlled within the given range, the lithium difluorophosphate ($LiPO_2F_2$) will form an interface film on the surface of the positive electrode in preference to the bis(fluorosulfonyl)imide (LiFSI), which effectively reduces the probability of catalytic oxidation of the bis(fluorosulfonyl)imide (LiFSI) on the surface of the positive electrode, thereby further improving the high temperature cycling performance of the battery.

In some embodiments, the mass ratio $(W_{LiFSI}+W_{EC})/W_{LiPO2F2}$ of the sum of the masses of the ethylene carbonate and the lithium bis(fluorosulfonyl)imide to the lithium difluorophosphate is 20-68, optionally 28-51. Optionally, the mass ratio $(W_{LiFSI}+W_{EC})/W_{LiPO2F2}$ of the sum of the masses of the ethylene carbonate and the lithium bis(fluorosulfonyl)imide to the mass of the lithium difluorophosphate can be within a numerical range consisting of any two of the following listed numerical values as end values: 20, 20.08, 28, 28.75, 33.57, 37.32, 40.32, 46.30, 50.43, 67.29, 68. For example, $20 \le (W_{LiFSI}+W_{EC})/W_{LiPO2F2} \le 68$, $28 \le (W_{LiFSI}+W_{EC})/W_{LiPO2F2} \le 68$, $28 \le (W_{LiFSI}+W_{EC})/W_{LiPO2F2} \le 51$, $28 \le (W_{LiFSI}+W_{EC})/W_{LiPO2F2} \le 46.3$. It should be noted that although the inventor has listed the aforementioned numerical values side by side, it doesn't mean that equivalent or similar performance can be obtained when $(W_{LiFSI}+W_{EC})/W_{LiPO2F2}$ is within a range consisting of any two of the aforementioned numerical values as endpoints. Regarding a preferred range of $(W_{LiFSI}+W_{EC})/W_{LiPO2F2}$ in the present disclosure, it can be selected based on the specific discussion and specific experimental data hereafter. When the mass relationship between the ethylene carbonate and the lithium bis(fluorosulfonyl)imide is controlled within the given range, it can further improve the high temperature cycling performance of the battery.

In some embodiments, the percentage mass content $W_{LiPO2F2}$ of the lithium difluorophosphate ($LiPO_2F_2$) in the electrolyte solution is below 1%, optionally 0.3%-0.7%. Optionally, the percentage mass content $W_{LiPO2F2}$ of the lithium difluorophosphate ($LiPO_2F_2$) in the electrolyte solution can be within a numerical range consisting of any two of the following listed numerical values as end values: 0%, 0.3%, 0.4%, 0.5%, 0.6%, 0.7%, 1.0%. For example, $0\% \le W_{LiPO2F2} \le 1\%$, $0.3\% \le W_{LiPO2F2} \le 1\%$, $0.3\% \le W_{LiPO2F2} \le 0.7\%$, $0.4\% \le W_{LiPO2F2} \le 0.7\%$, $0.5\% \le W_{LiPO2F2} \le 0.7\%$. It should be noted that although the inventor has listed the aforementioned numerical values side by side, it doesn't mean that equivalent or similar performance can be obtained when $W_{LiPO2F2}$ is within a range consisting of any two of the aforementioned numerical values as endpoints. Regarding a preferred range of $W_{LiPO2F2}$ in the present disclosure, it can be selected based on the specific discussion and specific experimental data hereafter.

In some embodiments, the sum of the percentage mass contents of the ethylene carbonate (EC) and the lithium bis(fluorosulfonyl)imide (LiFSI) in the electrolyte solution is 16%-24%, optionally 17%-24%. Optionally, the sum $(W_{LiFSI}+W_{EC})$ of percentage mass contents of the ethylene carbonate (EC) and the lithium bis(fluorosulfonyl)imide (LiFSI) can be within a numerical range consisting of any two of the following listed numerical values as end values: 16%, 16.06%, 17.24%, 17.73%, 18.66%, 18.74%, 19.76%, 20.08%, 20.13%, 20.14%, 20.16%, 20.17%, 20.19%, 20.23%, 21.73%, 23.15%, 23.23%, 24%. When the mass relationship between the ethylene carbonate (EC) and the lithium bis(fluorosulfonyl)imide (LiFSI) is controlled within the given range, it can further improve the power performance, high temperature cycling performance and high temperature storage performance of the battery.

In some embodiments, the percentage mass content of the lithium bis(fluorosulfonyl)imide (LiFSI) in the electrolyte solution is 6%-11%. Optionally, the percentage mass content of the lithium bis(fluorosulfonyl)imide (LiFSI) in the electrolyte solution can be within a numerical range consisting of any two of the following listed numerical values as end values: 4.5%, 4.62%, 6%, 6.16%, 7.70%, 9.24%, 10.78%, 11%. When the content of the lithium bis(fluorosulfonyl) imide is controlled within the given range, it can further improve the power performance, high temperature cycling performance and high temperature storage performance of the battery.

In some embodiments, the percentage mass content of the ethylene carbonate (EC) in the electrolyte solution is 8.3%-15.2%. Optionally, it is 10%-15.2%. Optionally, the percentage mass content of the ethylene carbonate (EC) in the electrolyte solution can be 8.36%, 10%, 10.03%, 12.37%, 12.38%, 12.43%, 12.44%, 12.45%, 12.46%, 12.47%, 12.49%, 12.50%, 12.53%, 12.58%, 12.62%, 15.14%, 15.2%, or its numerical value is within a range obtained by combining any two of the aforementioned numerical values. When the content of the ethylene carbonate is controlled within the given range, it can further improve the power performance, high temperature cycling performance and high temperature storage performance of the battery.

In some embodiments, the electrolyte salt further includes lithium hexafluorophosphate ($LiPF_6$), and in one embodiment, the sum $W_{LiFSI}+W_{LiPF6}$ of the percentage mass contents of the lithium hexafluorophosphate and the lithium bis(fluorosulfonyl)imide in the electrolyte solution is 15.7%47.2%, wherein $W_{LiPF6}$ is the percentage mass content of the lithium hexafluorophosphate in the electrolyte solution. Optionally, the sum of the percentage mass contents of the lithium hexafluorophosphate and the lithium bis(fluorosulfonyl)imide in the electrolyte solution can be 15.7%, 15.87%, 16.16%, 16.45%, 16.74%, 17.03%, 17.2%, or its numerical value is within a range obtained by combining any two of the aforementioned numerical values. When the percentage mass contents of the lithium hexafluorophosphate and the lithium bis(fluorosulfonyl)imide in the electrolyte solution is controlled within the given range, the concentration of $Li^+$ in the electrolyte solution will be kept within an appropriate range, which will make the electrolyte solution have good conductivity.

In some embodiments, the organic solvent further includes at least one of dimethyl carbonate, diethyl carbonate, methyl ethyl carbonate, methyl propyl carbonate, methyl formate, ethyl formate, methyl acetate, ethyl acetate, propyl propionate, ethyl butyrate, ethyl propionate, propyl butyrate, ethylene carbonate, propylene carbonate, butylene carbonate, gamma-butyrolactone and tetrahydrofuran.

In some embodiments, in addition to the lithium hexafluorophosphate ($LiPF_6$) and the lithium bis(fluorosulfonyl) imide (LiFSI), the electrolyte salt may also include one or more of lithium tetrafluoroborate ($LiBF_4$), lithium perchlorate ($LiClO_4$), lithium hexafluoroarsenate ($LiAsF_6$), lithium bis(trifluoromethanesulfonyl)imide (LiTFSI), lithium trifluoromethanesulfonate (LiTFS), lithium difluoro(oxalato) borate (LiDFOB), lithium bis(oxalate)borate (LiBOB), lithium difluoro bis(oxalato)phosphate (LiDFOP) and lithium tetrafluoro(oxalato)phosphate (LiTFOP).

In some embodiments, other kinds of additives are optionally included in the electrolyte solution. For example, the additive may include a negative-electrode film-forming additive, or may include a positive-electrode film-forming additive, or may include an additive that capable of improving some performances of the battery, such as an additive for improving the overcharge performance of the battery, an additive for improving the high temperature performance of the battery, an additive for improving the low-temperature performance of the battery, and the like.

Moreover, the secondary battery, battery module, battery pack and device of the present disclosure will be described hereafter with appropriate reference to the accompanying drawings.

In an embodiment of the present disclosure, a secondary battery is provided.

Generally, the secondary battery pack includes a positive electrode sheet, a negative electrode sheet, an electrolyte and a separator. During the charging and discharging process of the battery, active ions are embedded and detached back and forth between the positive electrode sheet and the negative electrode sheet. The electrolyte plays the role of conducting ions between the positive electrode sheet and the negative electrode sheet. The separator is arranged between the positive electrode sheet and the negative electrode sheet, which mainly plays a role in preventing the short circuit between the positive and negative electrodes, and meanwhile allowing the ions to pass through.

[Positive Electrode Sheet]

The positive electrode sheet includes a positive-electrode current collector and an positive-electrode film layer arranged on at least one surface of the positive-electrode current collector, wherein the positive-electrode film layer includes a positive-electrode active material, including but not limited to lithium cobaltate, lithium nickel manganese cobaltate, lithium nickel manganese aluminate, lithium iron phosphate, lithium vanadium phosphate, lithium cobalt phosphate, lithium manganese phosphate, lithium iron silicate, lithium vanadium silicate, lithium cobalt silicate, lithium manganese silicate, spinel lithium manganate, spinel lithium nickel manganate, lithium titanate, etc. One or more of these can be used as the positive-electrode active material.

As an example, the positive-electrode current collector has two opposite surfaces in its own thickness direction, and the positive-electrode film layer is arranged on either or both of the opposite surfaces of the positive-electrode current collector.

In the secondary battery of the present disclosure, a metal foil or a composite current collector can be employed as the positive-electrode current collector. For example, as the metal foil, aluminum foil can be employed. The composite current collector may include a high molecular material substrate layer and a metal layer formed on at least one surface of the high molecular material substrate layer. The composite current collector can be formed by forming a metal material (aluminum, aluminum alloy, nickel, nickel alloy, titanium, titanium alloy, silver and silver alloy, etc.) on the high molecular material substrate (e.g., polypropylene (PP), polyethylene terephthalate (PET), polybutylene terephthalate (PBT), polystyrene (PS), polyethylene (PE), etc.).

The positive-electrode film layer also in some embodiments includes a conductive agent. However, the type of the conductive agent is not specifically limited, and can be selected by those skilled in the art according to actual needs. As an example, the conductive agent used for the positive-electrode film layer can be selected from one or more of superconducting carbon, acetylene black, carbon black, Ketjen black, carbon dots, carbon nanotubes, graphene and carbon nanofibers.

In the present disclosure, the positive electrode sheet can be prepared according to a method known in the art. As an example, the positive-electrode active material, conductive agent and binder of the present disclosure can be dispersed in a solvent (e.g., N-methyl pyrrolidone (NMP)) to form a uniform positive-electrode slurry; the positive-electrode slurry is coated on the positive-electrode current collector, and subjected to drying, cold pressing and the like processes to obtain the positive electrode sheet.

[Negative Electrode Sheet]

The negative electrode sheet includes a negative-electrode current collector and a negative-electrode film layer arranged on at least one surface of the negative-electrode current collector, wherein the negative-electrode film layer includes a negative-electrode active material.

In the secondary battery of the present disclosure, a negative-electrode active material commonly used in the art for preparing the negative electrode of the secondary battery can be used as the negative-electrode active material. As the negative-electrode active material, artificial graphite, natural graphite, soft carbon, hard carbon, a silicon-based material, a tin-based material, lithium titanate and the like can be listed. The silicon-based material can be selected from one or more of elemental silicon, a silicon oxide compound (e.g., silicon (II) oxide), a silicon-carbon composite, a silicon-nitrogen composite and silicon alloy. The tin-based material can be selected from one or more of elemental tin, a tin oxide compound and tin alloy.

As an example, the negative-electrode current collector has two opposite surfaces in its own thickness direction, and the negative-electrode film layer is arranged on either or both of the opposite surfaces of the negative-electrode current collector.

In the secondary battery of the present disclosure, a metal foil or a composite current collector can be employed as the negative-electrode current collector. For example, as the metal foil, a copper foil can be employed. The composite current collector may include a high molecular material substrate layer and a metal layer formed on at least one surface of the high molecular material substrate. The composite current collector can be formed by forming a metal material (copper, copper alloy, nickel, nickel alloy, titanium, titanium alloy, silver and silver alloy, etc.) on the high molecular material substrate (e.g., polypropylene (PP), polyethylene terephthalate (PET), polybutylene terephthalate (PBT), polystyrene (PS), polyethylene (PE), etc.).

In the secondary battery of the present disclosure, the negative-electrode film layer usually includes a negative-electrode active material, an optional binder, an optional conductive agent and other optional adjuvants, and is usually formed by coating and drying a negative-electrode slurry. The negative-electrode slurry is usually formed by dispersing the negative-electrode active material, the optional conductive agent, the optional binder and the like in a solvent, and stirring them evenly. The solvent can be N-methyl pyrrolidone (NMP) or deionized water.

As an example, the conductive agent can be selected from one or more of superconducting carbon, acetylene black, carbon black, Ketjen black, carbon dots, carbon nanotubes, graphene and carbon nanofibers.

As an example, the binder can be selected from one or more of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

Other optional adjuvants are for example a thickener (such as sodium carboxymethylcellulose (CMC-Na)), etc.

[Separator]

In the secondary battery, generally a separator is further included. The separator separates the positive electrode sheet from the negative electrode sheet, preventing a short circuit in the battery, and enabling active ions to move between the positive and negative electrodes through the separator. The present disclosure has no particular limitation on the types of the separator, and any well-known separator of a porous structure with good chemical stability and mechanical stability can be selected for use. In some embodiments, the material of the separator can be selected from one or more of a glass fiber, non-woven cloth, polyethylene, polypropylene and polyvinylidene fluoride. The separator may be a single-layer thin film or a multi-layer composite thin film, and is not particularly limited. When the separator is a multi-layer composite thin film, the material of each layer may be the same or different, and there is no particular limitation on it.

In some embodiments, the positive electrode sheet, the negative electrode sheet and the separator can be made into an electrode assembly by a winding process or a lamination process.

In some embodiments, the secondary battery may include an outer package. The outer package can be used for packaging the aforementioned electrode assembly and the electrolyte solution.

In some embodiments, the outer package of the secondary battery may be a hard case, such as a hard plastic case, an aluminum case, a steel case, etc. The outer package of the secondary battery may also be a soft package, such as a bag-type soft package. The material of the soft package can be plastic, and as the plastic, polypropylene (PP), polybutylene terephthalate (PBT), polybutylene succinate (PBS) and the like can be listed.

The present disclosure has no particular limitation on the shape of the secondary battery, which can be cylindrical, square or any other shape. For example, FIG. 1 shows a secondary battery 5 with a square structure as an example.

Figure 2:
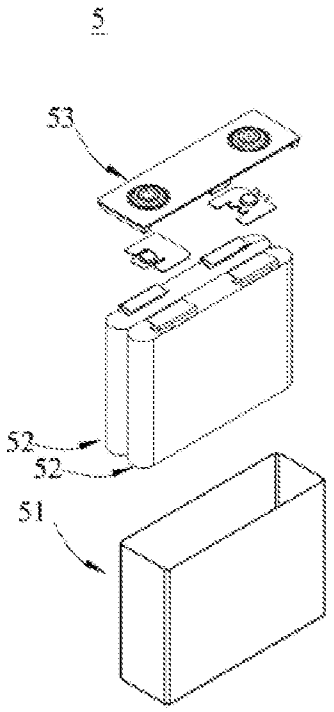
FIG. 2 is an exploded view of the secondary battery according to an embodiment of the present disclosure shown in FIG. 1.

In some embodiments, referring to FIG. 2, the outer package may include a case 51 and a cover plate 53. The case 51 may include a bottom plate and a side plate connected to the bottom plate, and the bottom plate and the side plate enclose to form an accommodating cavity. The case 51 has an opening in communication with the accommodating cavity, and the cover plate 53 can cover the opening to close the accommodating cavity. The positive electrode sheet, the negative electrode sheet and the separator can be subjected to a winding or laminating process to form a electrode assembly 52. The electrode assembly 52 is encapsulated in the accommodating cavity. The electrode solution is soaked in the electrolyte assembly 52 The number of the electrode assemblies 52 included in the secondary battery 5 can be one or more, which can be selected by those skilled in the art according to specific practical requirements.

In some embodiments, the secondary batteries can be assembled into a battery module, and the number of the secondary batteries included in the battery module can be one or more, and the specific number can be selected by those skilled in the art according to the disclosure and capacity of the battery module.

Figure 3:
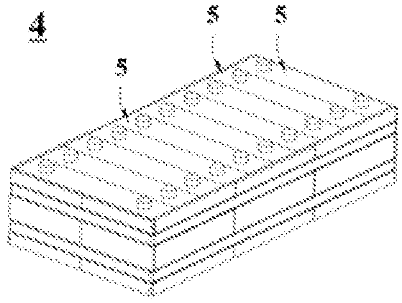
FIG. 3 is a schematic diagram of a battery module according to an embodiment of the present disclosure.

FIG. 3 shows a battery module 4 as an example. Referring to FIG. 3, in the battery module 4, multiple secondary batteries 5 may be sequentially arranged along a length direction of the battery module 4. Of course, they can also be arranged in any other way. The multiple secondary batteries 5 can be further fixed by fasteners.

Optionally, the battery module 4 may further include a shell having an accommodating space in which the multiple secondary batteries 5 are accommodated.

In some embodiments, the aforementioned battery modules can also be assembled into a battery pack, and the number of the battery modules included in the battery pack can be selected by those skilled in the art according to the disclosure and capacity of the battery pack.

Figure 4:
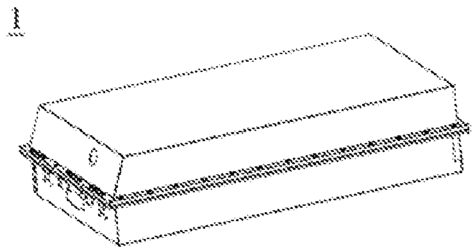
FIG. 4 is a schematic diagram of a battery pack according to an embodiment of the present disclosure.
Figure 5:
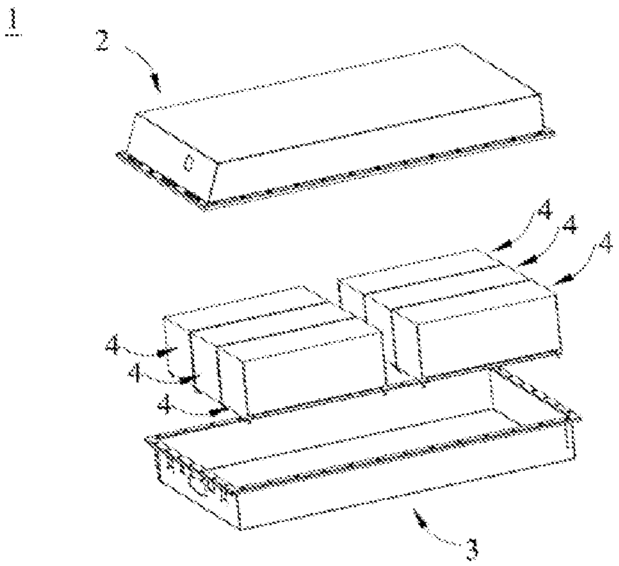
FIG. 5 is an exploded view of the battery pack according to an embodiment of the present disclosure shown in FIG. 4.

FIGS. 4 and 5 show a battery pack 1 as an example. Referring to FIGS. 4 and 5, the battery pack 1 may include a battery box and multiple battery modules 4 disposed in the battery box. The battery box includes an upper box 2 and a lower box 3, the upper box 2 can cover the lower box 3 to form a closed space for accommodating the battery modules 4. The multiple battery modules 4 can be arranged in the battery box in any way.

Additionally, the present disclosure also provides a device including one or more of the secondary battery, battery module or battery pack provided by the present disclosure. The secondary battery, battery module, or battery pack can be used as a power source of the device, or as an energy storage unit of the device. The device can be, but not limited to, mobile devices (e.g., a mobile phone, a laptop, etc.), electric vehicles (e.g., an all-electric vehicle, a hybrid electric vehicle, a plug-in hybrid electric vehicle, an electric bicycle, an electric scooter, an electric golf cart, an electric truck, etc.), electric trains, ships and satellites, energy storage systems, etc.

As a device, the secondary battery, battery module or battery pack can be selected according to the use requirements of the device.

Figure 6:
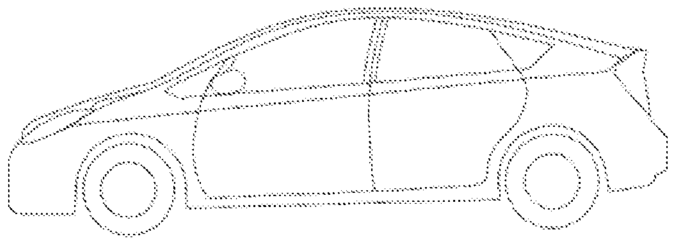
FIG. 6 is a schematic diagram of a device in which a secondary battery is used as a power source, according to an embodiment of the present disclosure.

FIG. 6 shows a device as an example. The device is an all-electric vehicle, a hybrid electric vehicle or a plug-in hybrid electric vehicle, and the like. In order to satisfy the requirements of the device for high power and high energy density of the secondary battery, the battery pack or battery module can be employed.

As another example, the device may be a mobile phone, a tablet, a laptop, etc. Lighting and thinning of the device are generally required, and thus the secondary battery can be employed as the power source.

EXAMPLES

Examples of the present disclosure will be described hereinafter. The following examples are illustrative and only for explaining the present disclosure, and should not be construed as limiting the present disclosure. If no specific technology or condition is indicated in the examples, it shall be carried out according to the technology or condition described in the literature in the art or according to product specifications. All of the used reagents or instruments which are not specified with the manufacturer are conventional commercially available products. Unless otherwise specified, the content of each component in the examples of the present invention is based on mass.

Example 1

Lithium ion batteries (referred to as batteries for short) were all prepared according to the following method:

(1) Preparation of Positive Electrode Sheet:

A ternary material as a positive-electrode active material ($LiNi_{0.8}Co_{0.1}Mn_{0.1}$), a binder of polyvinylidene fluoride and a conductive agent of acetylene black were mixed according to a weight ratio of 90:5:5, added with N-methyl pyrrolidone (NMP), and stirred under the action of a vacuum stirrer until the system was uniform and transparent, so as to obtain a positive-electrode slurry; the positive-electrode slurry was evenly coated onto a aluminum foil; and the aluminum foil was dried in the air at room temperature, then transferred into an oven at 120° C. for drying for 1 h, and then subjected to cold pressing and slitting to obtain a positive electrode sheet.

(2) Preparation of Negative Electrode Sheet:

A negative-electrode active material of artificial graphite, a conductive agent of carbon black and a binder of SBR were mixed according to a mass ratio of 92:2:6, added with deionized water, and stirred under the action of a vacuum stirrer to obtain a negative-electrode slurry; the negative-electrode slurry was evenly coated on a copper foil as the negative-electrode current collector; the copper foil was dried in the air at room temperature, transferred to an oven at 120° C. for drying for 1 h, and then subjected to cold pressing and slitting to obtain a negative electrode sheet.

(3) Preparation of Electrolyte Solution:

In an argon atmosphere glove box with a water content <10 ppm, organic solvents ethylene carbonate (EC), methyl ethyl carbonate (EMC) and diethyl carbonate (DEC) were mixed according to a mass ratio of EC:EMC:DEC=15:55:30 to prepare a mixed organic solvent solution. The mixed solution was sequentially added with a certain amount of lithium bis(fluorosulfonyl)imide (LiFSI) and lithium hexafluorophosphate ($LiPF_6$); wherein, the percentage mass content of the lithium bis(fluorosulfonyl)imide (LiFSI) in the electrolyte solution was 4.62%, the percentage mass content of the lithium hexafluorophosphate ($LiPF_6$) in the electrolyte solution was 11.25%, the percentage mass content of the ethylene carbonate (EC) in the electrolyte solution was 12.62%, and $W_{LiFSI}/(16.77\%-W_{EC})=1.11$.

(4) Preparation of Secondary Battery:

The positive electrode sheet, the separator and the negative electrode sheet were stacked in sequence, so that the separator was positioned between the positive electrode sheet and the negative electrode sheet to play an isolation role, and then wound to obtain an electrode assembly; the electrode assembly was placed in an outer package, poured with the electrolyte solution prepared above, and subjected to vacuum packaging, standing, formation, shaping and the like procedures to obtain a secondary battery.

Examples 2-17 and Comparative Examples 1-5

The preparation methods of Examples 2-17 and Comparative Examples 1-5 were similar to that of Example 1, except that the mass ratio of the ethylene carbonate (EC), the mass ratio of the lithium bis(fluorosulfonyl)imide (LiFSI), the mass ratio of the lithium hexafluorophosphate ($LiPF_6$), the mass ratio of the lithium difluorophosphate ($LiPO_2F_2$) and the like product parameters were adjusted. see Table 1 for details of different product parameters. In Examples 10-17, the mixed organic solvent solution was added with a certain amount of the lithium bis(fluorosulfonyl)imide (LiFSI) and the lithium hexafluorophosphate ($LiPF_6$), and then added with the lithium difluorophosphate ($LiPO_2F_2$).

TABLE 1

Parameters of Examples 1-17 and Comparative Examples 1-5

| | Organic Solvent (mass ratio) | $W_{EC}$ | $W_{LiFSI}$ | $W_{LiPF6}$ | $W_{LiPO2F2}$ | $W_{LiFSI}/(16.77 - W_{EC})$ | $W_{LiFSI} + W_{EC}$ | $W_{LiFSI} + W_{LiPF6}$ |
|---|---|---|---|---|---|---|---|---|
| Example 1 | EC:EMC:DEC = 15:55:30 | 12.62% | 4.62% | 11.25% | 0% | 1.11 | 17.24 | 15.87 |
| Example 2 | EC:EMC:DEC = 15:55:30 | 12.58% | 6.16% | 10.00% | 0% | 1.47 | 18.74 | 16.16 |
| Example 3 | EC:EMC:DEC = 15:55:30 | 12.53% | 7.70% | 8.75% | 0% | 1.82 | 20.23 | 16.45 |
| Example 4 | EC:EMC:DEC = 15:55:30 | 12.49% | 9.24% | 7.50% | 0% | 2.16 | 21.73 | 16.74 |
| Example 5 | EC:EMC:DEC = 15:55:30 | 12.45% | 10.78% | 6.25% | 0% | 2.49 | 23.23 | 17.03 |
| Example 6 | EC:EMC = 15:85 | 12.53% | 7.70% | 8.75% | 0% | 1.82 | 20.23 | 16.45 |
| Example 7 | EC:EMC:DEC = 10:60:30 | 8.36% | 7.70% | 8.75% | 0% | 0.92 | 16.06 | 16.45 |
| Example 8 | EC:EMC:DEC = 12:58:30 | 10.03% | 7.70% | 8.75% | 0% | 1.14 | 17.73 | 16.45 |
| Example 9 | EC:EMC:DEC = 18:52:30 | 15.14% | 4.62% | 11.25% | 0% | 2.84 | 19.76 | 15.87 |
| Example 10 | EC:EMC:DEC = 15:55:30 | 12.49% | 7.70% | 8.75% | 0.3% | 1.80 | 20.19 | 16.45 |
| Example 11 | EC:EMC:DEC = 15:55:30 | 12.47% | 7.70% | 8.75% | 0.4% | 1.79 | 20.17 | 16.45 |
| Example 12 | EC:EMC:DEC = 15:55:30 | 12.46% | 7.70% | 8.75% | 0.5% | 1.79 | 20.16 | 16.45 |
| Example 13 | EC:EMC:DEC = 15:55:30 | 12.44% | 7.70% | 8.75% | 0.6% | 1.78 | 20.14 | 16.45 |
| Example 14 | EC:EMC:DEC = 15:55:30 | 12.43% | 7.70% | 8.75% | 0.7% | 1.77 | 20.13 | 16.45 |
| Example 15 | EC:EMC:DEC = 15:55:30 | 12.38% | 7.70% | 8.75% | 1% | 1.75 | 20.08 | 16.45 |

TABLE 1-continued

| Parameters of Examples 1-17 and Comparative Examples 1-5 | | | | | | | | |
|---|---|---|---|---|---|---|---|---|
| | Organic Solvent (mass ratio) | $W_{EC}$ | $W_{LiFSI}$ | $W_{LiPF6}$ | $W_{LiPO2F2}$ | $W_{LiFSI}$/ (16.77 − $W_{EC}$) | $W_{LiFSI}$ + $W_{EC}$ | $W_{LiFSI}$ + $W_{LiPF6}$ |
| Example 16 | EC:EMC:DEC = 15:55:30 | 12.37% | 10.78% | 6.25% | 0.5% | 2.45 | 23.15 | 17.03 |
| Example 17 | EC:EMC:DEC = 15:55:30 | 12.50% | 6.16% | 10.00% | 0.5% | 1.44 | 18.66 | 16.16 |
| Comparative Example 1 | EC:EMC:DEC = 18:52:30 | 15.04% | 7.70% | 8.75% | 0% | 4.45 | 22.74 | 16.45 |
| Comparative Example 2 | EMC:DEC = 60:40 | 0.00% | 10.78% | 6.25% | 0% | 0.64 | 10.78 | 17.03 |
| Comparative Example 3 | EC:EMC:DEC = 15:55:30 | 12.71% | 1.54% | 13.75% | 0% | 0.38 | 14.25 | 15.29 |
| Comparative Example 4 | EC:EMC:DEC = 15:55:30 | 12.36% | 13.86% | 3.75% | 0% | 3.14 | 26.22 | 17.61 |
| Comparative Example 5 | EC:EMC:DEC = 5:65:30 | 4.18% | 7.70% | 8.75% | 0% | 0.61 | 11.88 | 16.45 |

TABLE 2

| Parameter Proportion of Examples 10-17 | | |
|---|---|---|
| | $W_{LiFSI}/W_{LiPO2F2}$ | $(W_{LiFSI} + W_{EC})/W_{LiPO2F2}$ |
| Example 10 | 25.67 | 67.29 |
| Example 11 | 19.25 | 50.43 |
| Example 12 | 15.40 | 40.32 |
| Example 13 | 12.83 | 33.57 |
| Example 14 | 11.00 | 28.75 |
| Example 15 | 7.70 | 20.08 |
| Example 16 | 21.56 | 46.30 |
| Example 17 | 12.32 | 37.32 |

Performance Test (1) 60° C. Expansion Rate Test of Lithium-Ion Battery

At 60° C., a lithium-ion battery was charged to 4.35 V at a constant current of 0.5 C, and then charged at a constant voltage until the current decreased to 0.05 C. At this time, the thickness of the lithium-ion battery was determined and recorded as $h_0$; after that, the lithium-ion battery was put into a thermostat at 60° C., stored for 30 days, and then taken out. At this time, the thickness of the lithium-ion battery was determined and recorded as $h_1$. The thickness expansion rate of the lithium-ion battery after storage for 30 days=$[(h_1-h_0)/h_0]\times100\%$.

(2) Initial DCR Performance Test of Lithium-Ion Battery

The prepared new battery was charged to 4.35 V at a constant current of 1 C, then charged at a constant voltage until the current decreased to 0.05 C, and then discharged at a constant current of 1 C for 30 min, at which time the voltage was $V_1$; then the battery was discharged at a constant current of 4 C (I) for 30 s, the voltage at the end of discharge was $V_2$, the sampling point was 0.1 s, and the discharge DCR of 50% SOC of the cell was $(V_1-V_2)/I$.

(3) Cycling Capacitance Test of Battery

At 45° C., the secondary battery was charged to 4.25 V at a constant current of 1 C, then charged at a constant voltage of 4.25 V until the current was 0.05 C, allowed to stand for 5 mins, and then discharged at a constant current of 1 C to a lower limit of cut-off voltage. This was the first charge/discharge cycle of the secondary battery, and the discharge capacity of this cycle was recorded as the discharge capacity of the first cycle of the secondary battery. According to the aforementioned method, the secondary battery was charged/discharged for 800 cycles to obtain the discharge capacity of the secondary battery after 800 cycles. The capacity retention rate (%) of the secondary battery after 800 cycles at 45° C.=(the discharge capacity of the secondary battery after 800 cycles/the discharge capacity of the first cycle of the secondary battery)×100%.

TABLE 3

| Battery test results | | | |
|---|---|---|---|
| | % Expansion rate of storage volume at 60° C. | Initial DCR (mohm) | % High temperature cycling retention rate at 45° C. |
| Example 1 | 14.2 | 33.1 | 78.1 |
| Example 2 | 12.5 | 30.5 | 78.6 |
| Example 3 | 13.5 | 29.7 | 80.1 |
| Example 4 | 13.9 | 26.8 | 79.7 |
| Example 5 | 13.7 | 25.6 | 81.3 |
| Example 6 | 14.1 | 30.2 | 79.8 |
| Example 7 | 11.9 | 33.7 | 78.9 |
| Example 8 | 13.3 | 32.5 | 80.2 |
| Example 9 | 14.8 | 30.5 | 82.3 |
| Example 10 | 13.7 | 28.9 | 80.4 |
| Example 11 | 13.8 | 28.5 | 80.9 |
| Example 12 | 13.8 | 27.1 | 82.5 |
| Example 13 | 13.9 | 27 | 82.8 |
| Example 14 | 14.1 | 25.6 | 82.7 |
| Example 15 | 14.1 | 33.1 | 80.5 |
| Example 16 | 14.1 | 24.5 | 81.6 |
| Example 17 | 12.1 | 27.8 | 80.1 |
| Comparative Example 1 | 19.9 | 22.1 | 78.1 |
| Comparative Example 2 | 7.5 | 45.9 | 59.1 |
| Comparative Example 3 | 13.1 | 33.9 | 78.9 |
| Comparative Example 4 | 22.1 | 24.5 | 75.1 |
| Comparative Example 5 | 9 | 40.9 | 70 |

According to the aforementioned results, it could be seen that in the electrolyte solution obtained in Examples 1-17, the percentage mass content of the lithium bis(fluorosulfonyl)imide (LiFSI) in the electrolyte solution is 4.5%-11%; and the percentage mass contents of the ethylene carbonate (EC) and the lithium bis(fluorosulfonyl)imide (LiFSI) satisfy: $0.9\leq W_{LiFSI}/(16.77\%-W_{EC})\leq2.9$. A battery prepared with this electrolyte solution had better power performance, high temperature storage performance and high temperature cycling performance. However, the contents of each component in Comparative Examples 1-5 were outside the aforementioned range, and their power performance, high temperature storage performance and high temperature cycling performance were not as good as those of Examples 1-17.

Additionally, according to the aforementioned results, it could be seen that the electrolyte solution of Examples 10-17 is further added with lithium difluorophosphate ($LiPO_2F_2$), and the battery prepared by using this electrolyte solution had better high temperature cycling performance than Examples 1-9.

It should be noted that the present disclosure is not limited to the aforementioned embodiments. The aforementioned embodiments are only examples, and the embodiments that have substantially the same composition as the technical idea and exert the same effects within the scope of the technical solution of the present disclosure are all included in the technical scope of the present disclosure. Furthermore, without departing from the scope of the subject matter of the present disclosure, various modifications that can come into the mind of those skilled in the art applied to the embodiments and other embodiments constructed by combining partial composition elements of the embodiments are also included in the scope of the present disclosure.

The invention claimed is:

1. An electrolyte solution comprising an electrolyte salt, an additive, and an organic solvent; and, wherein the electrolyte salt comprises lithium bis(fluorosulfonyl) imide and lithium hexafluorophosphate, wherein a percentage mass content of the lithium bis(fluorosulfonyl) imide in the electrolyte solution is between 4.5% and 11%, a percentage mass content of the lithium hexafluorophosphate in the electrolyte solution is between 6.25% and 11.25%, a sum of the percentage mass content of the lithium hexafluorophosphate and the lithium bis(fluorosulfonyl)imide in the electrolyte solution is 15.7% to 17.2%;

the organic solvent comprises ethylene carbonate (EC), ethyl methyl carbonate (EMC), a mass percentage content of methyl ethyl carbonate (EMC) is from 52% to 58%, based on a total mass of the organic solvent, a percentage mass content of the ethylene carbonate (EC) in the electrolyte solution is between 8.3% and 15.2%;

the additive comprising lithium difluorophosphate, a percentage mass content of the lithium difluorophosphate in the electrolyte solution is from 0 to 1%; and the electrolyte solution satisfies: $0.9 \leq W_{LiFSI}/(16.77\%-W_{EC}) \leq 2.9$, $16\% \leq W_{LiFSI}+W_{EC} \leq 24\%$, wherein $W_{LiFSI}$ is the percentage mass content of the lithium bis(fluorosulfonyl)imide in the electrolyte solution, and $W_{EC}$ is the percentage mass content of the ethylene carbonate (EC) in the electrolyte solution.

2. The electrolyte solution according to claim 1, wherein $1.05 \leq W_{LiFSI}/(16.77\%-W_{EC}) \leq 2.9$.

3. The electrolyte solution according to claim 1, wherein a mass ratio of the lithium bis(fluorosulfonyl)imide to the lithium difluorophosphate is 7-26.

4. The electrolyte solution according to claim 1, wherein a ratio of the sum of the masses of the ethylene carbonate (EC) and the lithium bis(fluorosulfonyl)imide to the mass of the lithium difluorophosphate is 20-68.

5. The electrolyte solution according to claim 1, wherein the sum of the percentage mass contents of the ethylene carbonate (EC) and the lithium bis(fluorosulfonyl)imide in the electrolyte solution is 17%-24%.

6. The electrolyte solution according to claim 1, wherein the mass percentage of methyl ethyl carbonate (EMC) is from 55% to 58%, based on a total mass of the organic solvent.

7. The electrolyte solution according to claim 1, wherein the mass percentage of ethylene carbonate (EC) is from 10% to 15.2%, based on a total mass of the organic solvent.

8. The electrolyte solution according to claim 1, wherein the organic solvent further comprises diethyl carbonate (DEC), a mass percentage content of the diethyl carbonate (DEC) is 30%, based on the total mass of the organic solvent.

9. A secondary battery comprising the electrolyte solution of claim 1.

10. A device comprising at least one selected from the secondary battery of claim 9.

* * * * *